United States Patent
Chiu et al.

(10) Patent No.: US 7,933,015 B2
(45) Date of Patent: Apr. 26, 2011

(54) MARK FOR ALIGNMENT AND OVERLAY, MASK HAVING THE SAME, AND METHOD OF USING THE SAME

(75) Inventors: Chui-Fu Chiu, Taoyuan (TW); Jung-Chih Kuo, Taoyuan (TW)

(73) Assignee: Nanya Technology Corp. (TW)

( * ) Notice: Subject to any disclaimer, the term of this patent is extended or adjusted under 35 U.S.C. 154(b) by 481 days.

(21) Appl. No.: 12/035,550

(22) Filed: Feb. 22, 2008

(65) Prior Publication Data

US 2009/0040536 A1    Feb. 12, 2009

(30) Foreign Application Priority Data

Aug. 9, 2007  (TW) ............................... 96129370 A (51) Int. Cl.
 *G01B 11/00* (2006.01)
 *G03F 9/00* (2006.01)
 *G03C 5/00* (2006.01)
(52) U.S. Cl. .............................. 356/401; 430/22; 430/30
(58) Field of Classification Search ........................ None
 See application file for complete search history.

(56) References Cited

U.S. PATENT DOCUMENTS

| | | | |
|---|---|---|---|
| 6,218,200 B1 * | 4/2001 | Chen et al. ...................... 438/14 |
| 7,084,962 B2 * | 8/2006 | Bauch et al. ..................... 355/77 |
| 7,158,233 B2 * | 1/2007 | Tanaka ........................... 356/401 |
| 7,456,966 B2 * | 11/2008 | Froebel et al. ................. 356/399 |
| 7,468,331 B2 * | 12/2008 | Huggins ....................... 438/800 |
| 7,553,611 B2 * | 6/2009 | Chen et al. ..................... 430/394 |
| 7,723,181 B2 * | 5/2010 | Liu et al. ....................... 438/243 |

* cited by examiner

Primary Examiner — Tarifur Chowdhury
Assistant Examiner — Gordon J Stock, Jr.
(74) Attorney, Agent, or Firm — Ingrassia Fisher & Lorenz, P.C.

(57) ABSTRACT

A mark for alignment and overlay, a mask having the same, and a method of using the same are provided. The mark includes a first mark pattern and a second mark pattern. The first mark pattern includes a first pattern and a second pattern, and the second mark pattern includes a third pattern and a fourth pattern. The first pattern includes a plurality of rectangular regions arranged in a first direction, and for each rectangular region, a sideline in a second direction is longer than a sideline in the first direction, wherein the first direction is perpendicular to the second direction. The second pattern is disposed on both sides of the first pattern in the second direction and includes a plurality of rectangular regions arranged in the second direction, and for each rectangular region, the sideline in the first direction is longer than a sideline in the second direction. The third pattern includes two rectangular regions disposed on both sides of the first pattern in the first direction, and the fourth pattern includes two rectangular regions disposed on both sides of the second pattern in the second direction.

5 Claims, 6 Drawing Sheets

MARK FOR ALIGNMENT AND OVERLAY, MASK HAVING THE SAME, AND METHOD OF USING THE SAME

CROSS REFERENCE TO RELATED APPLICATIONS

This application claims the right of priority based on Taiwan Patent Application No. 96129370 entitled "MARK FOR ALIGNMENT AND OVERLAY, MASK HAVING THE SAME, AND METHOD OF USING THE SAME", filed on Aug. 9, 2007, which is incorporated herein by reference and assigned to the assignee herein.

FIELD OF INVENTION

The invention is generally related to a mark on a mask, especially to a mark for both alignment and overlay, a mask with the same, and the method of using the same.

BACKGROUND OF THE INVENTION

The photolithography process is one of the most important technologies in integrated circuit fabrication, because the device structures or the patterns of each film in the integrated circuit are all determined by the photolithography process. Since the circuit layout is composed of multiple layers, it is necessary to perform an alignment step in each exposure process to prevent improper pattern transfer. Therefore, the alignment marks are provided on the mask for alignment in each of the photolithography processes. In addition, in order to further detect the overlay accuracy between two adjacent layers, the overlay marks are also provided on the mask for measuring an overlay error between two layers.

Figure 1:
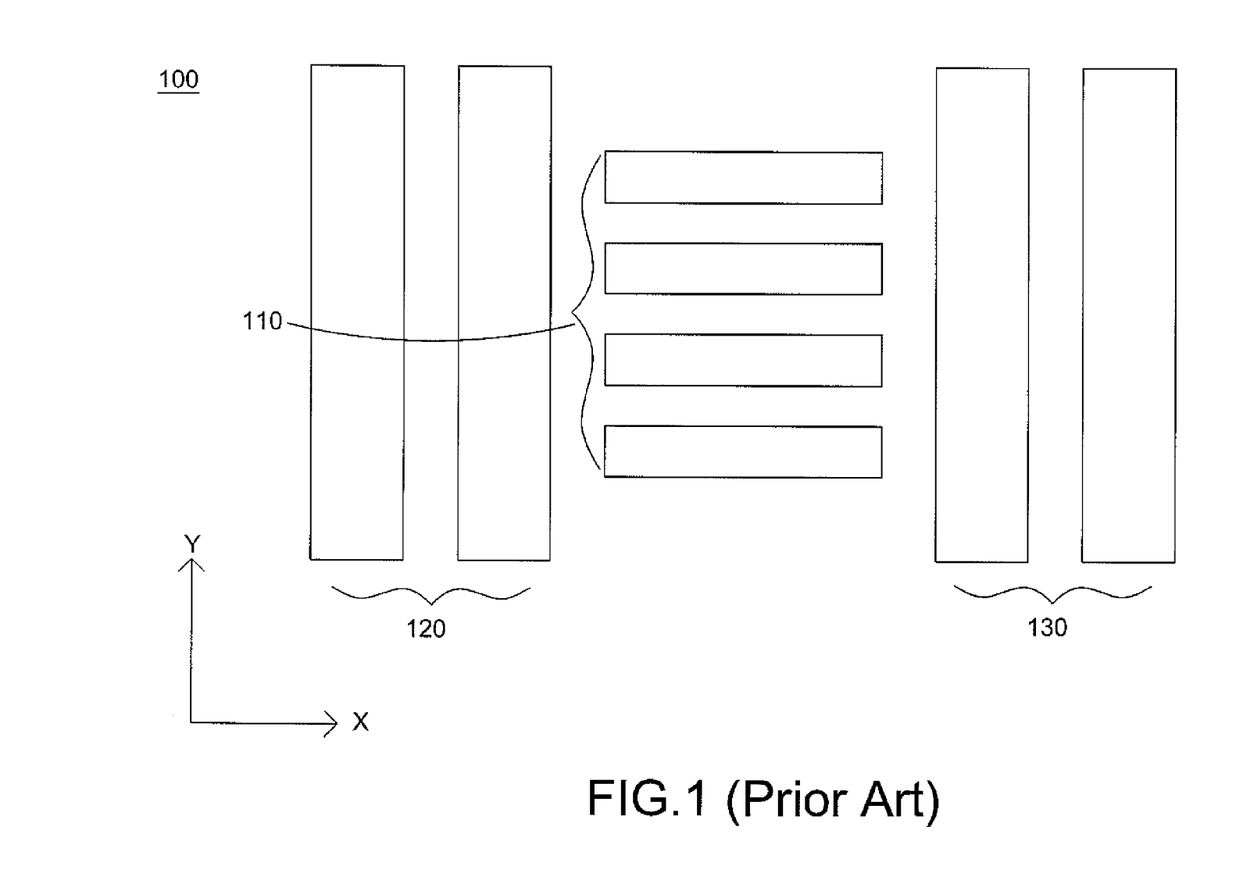
FIG. 1 is a top plan view of a conventional alignment mark.

FIG. 1 is a conventional alignment mark 100, which includes a Y-direction mark 110 and X-direction marks 120 and 130. The Y-direction mark 110 includes a plurality of rectangular regions, being arranged in Y direction and parallel with each other, for Y-direction alignment, are disposed on two opposite sides of the Y-direction mark 110 respectively in X direction, and each of the X-direction marks 120 and 130 includes a plurality of rectangular regions, being arranged in X direction and parallel with each other, for X-direction alignment. Typically, for an exposure machine, before executing the calibration procedure, a photolithography process is performed on a wafer via a mask having the alignment mark 100, and an etching process is then performed to form an exposed pattern corresponding to the alignment mark 100 on the wafer. Next, in the subsequent exposure process, the exposure machine can execute the calibration procedure by utilizing the pattern formed on the wafer to make necessary adjustment.

Figure 2:
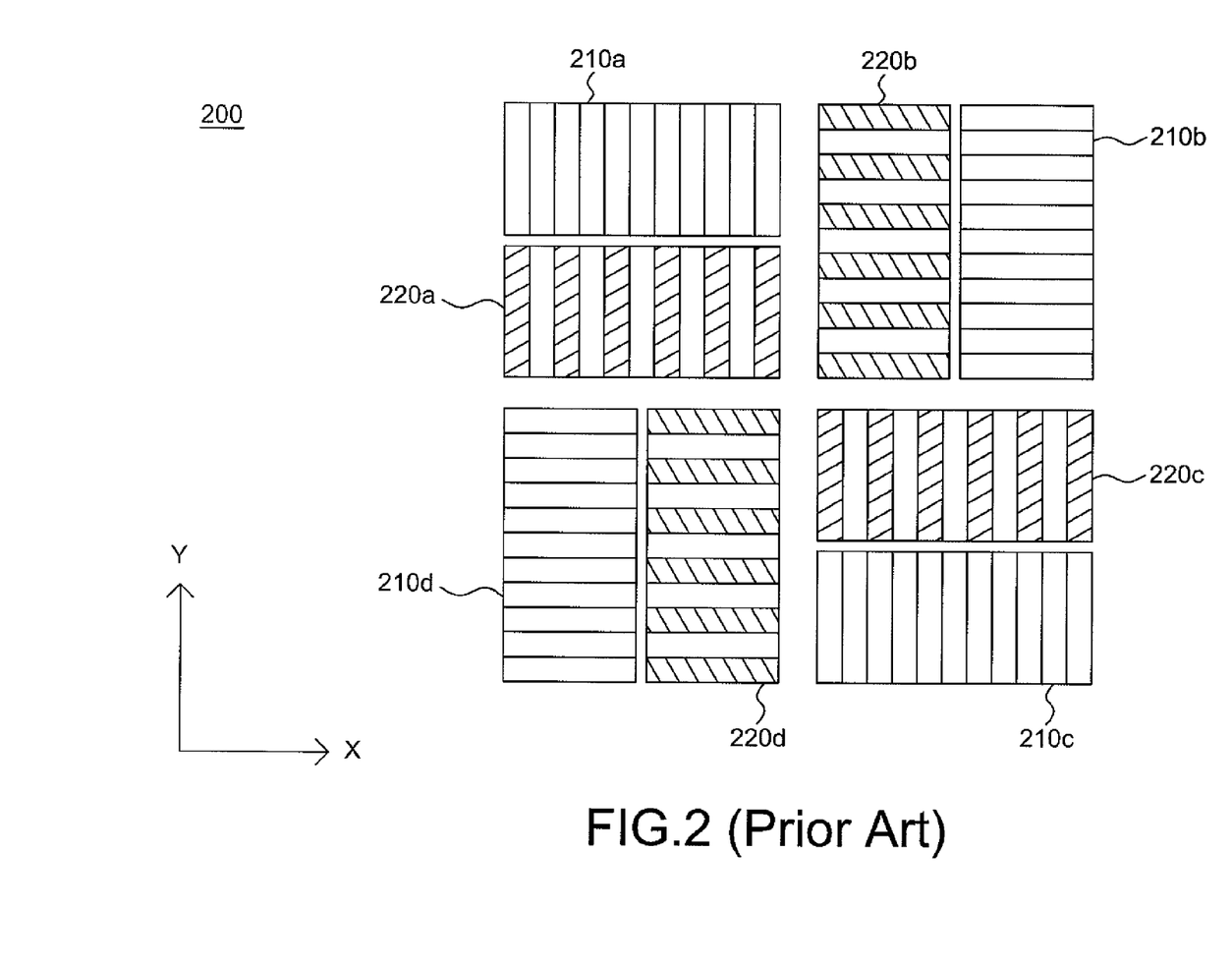
FIG. 2 illustrates a top plan view of a conventional overlay mark for determining a relative position between two or more layers in a semiconductor structure.

FIG. 2 illustrates a conventional overlay mark 200 for determining a relative position between two or more layers in a semiconductor structure, which includes first mark patterns 210a, 210b, 210c, 210d associated with the first layer and second mark patterns 220a, 220b, 220c, 220d associated with the second layer. The first mark patterns 210a and 210c are used together with the second mark patterns 220a and 220c for measuring the overlay error in X-direction, and the first mark patterns 210b and 210d are used together with the second mark patterns 220b and 220d for measuring the overlay error in Y-direction. The first exposed patterns corresponding to the first mark patterns 210a, 210b, 210c, and 210d are formed on the wafer during the first-layer process, and then the second mark patterns 220a, 220b, 220c, and 220d are transferred into the photoresist layer by the photolithography process of the second-layer process to form the second exposed patterns. Next, a relative position between the first and the second patterns is measured and the overlay error between two adjacent layers is calculated to determine whether an offset is necessary for these two adjacent layers.

Generally, a plurality of alignment marks and a plurality of overlay marks are simultaneously present on different positions of the mask, and occupy a space of the mask respectively. Besides, because the mark used for alignment is different from the mark used for overlay error measurement, the overlay error between two adjacent layers is likely too large to meet the process requirements, which may reduce the accuracy, increase the failure rate, and further raise the production cost.

SUMMARY OF THE INVENTION

According to one aspect of the present invention, a mark for both alignment and overlay is provided, which can save the space occupied by various marks on a mask, effectively improve the accuracy of exposure process and further increase the yield rate of the entire process.

According to one aspect of the present invention, a mark for alignment and overlay is provided, which includes a first mark pattern and a second mark pattern. The first mark pattern includes a first pattern and a second pattern, and the second mark pattern includes a third pattern and a fourth pattern. The first pattern includes a plurality of rectangular regions arranged in a first direction, and for each rectangular region, a sideline in a second direction is longer than a sideline in the first direction, wherein the first direction is perpendicular to the second direction. The second pattern is disposed on both sides of the first pattern in the second direction and includes a plurality of rectangular regions arranged in a second direction, and for each rectangular region, the sideline in the first direction is longer than a sideline in the second direction. The third pattern includes two rectangular regions disposed on both sides of the first pattern in the first direction, and the fourth pattern includes two rectangular regions disposed on both sides of the second pattern in the second direction. The second mark pattern is used together with the first mark pattern for determining an overlay error on a wafer.

According to another aspect of the present invention, a mask used in a semiconductor process is provided, which includes a plurality of the aforementioned marks for alignment and overlay.

According to still another aspect of the present invention, an exposure method utilizing the aforementioned marks, which has functions of both alignment and overlay, is provided. The method includes the following steps: providing a first mask having a first mark pattern; forming a first exposed pattern corresponding to a first mark pattern on a wafer via the first mask, and performing a semiconductor process; forming a photoresist layer on the wafer; providing a second mask having a second mark pattern; determining a position of the second mask relative to the wafer based on the first exposed pattern; forming a second exposed pattern corresponding to the second mark pattern on the photoresist layer via the second mask; and measuring a relative distance between the first exposed pattern and the second exposed pattern to determine an overlay error. The first mark pattern includes a first pattern and a second pattern, and the second mark pattern includes a third pattern and a fourth pattern. The first pattern includes a plurality of rectangular regions arranged in a first direction, and for each rectangular region of the first pattern, a sideline in a second direction is longer than a sideline in the first direction, wherein the first direction is perpendicular to the second direction. The second pattern is disposed on both sides of the first pattern in the second direction and includes a plurality of rectangular regions arranged in the second direction, and for each rectangular region of the second pattern; a sideline in a first direction is longer than a sideline in the second direction. The third pattern includes two rectangular regions disposed on both sides of the first pattern in the first direction. The fourth pattern includes two rectangular regions disposed on both sides of the second pattern in the second direction.

Other aspects of the present invention would be stated and easily understood through the following description or the embodiments of the present invention. The aspects of the present invention would be appreciated and implemented by the elements and their combinations pointed out in the appended claims. It should be understood that the above summary of the invention and the following detailed description are only illustrative but not to limit the present invention.

BRIEF DESCRIPTION OF THE PICTURES

The present invention is illustrated by way of example and not intended to be limited by the figures of the accompanying drawing, in which like notations indicate similar elements.

DETAILED DESCRIPTION OF THE INVENTION

The present invention discloses a mark for alignment and overlay, a mask with the mark, and the method of using the same, which can save the space of the mask occupied by the marks and effectively improve the accuracy of process. The objects, embodiments, features and advantages of the present invention would be more apparent by referring to the following description of the preferred embodiments and the drawings. However, the apparatuses, elements, and steps of the method described in the following embodiments are intended to illustrate the present invention, but not to limit the scope of the invention. It is noted that the drawings of the present application are not drawn to scale.

Figure 3:
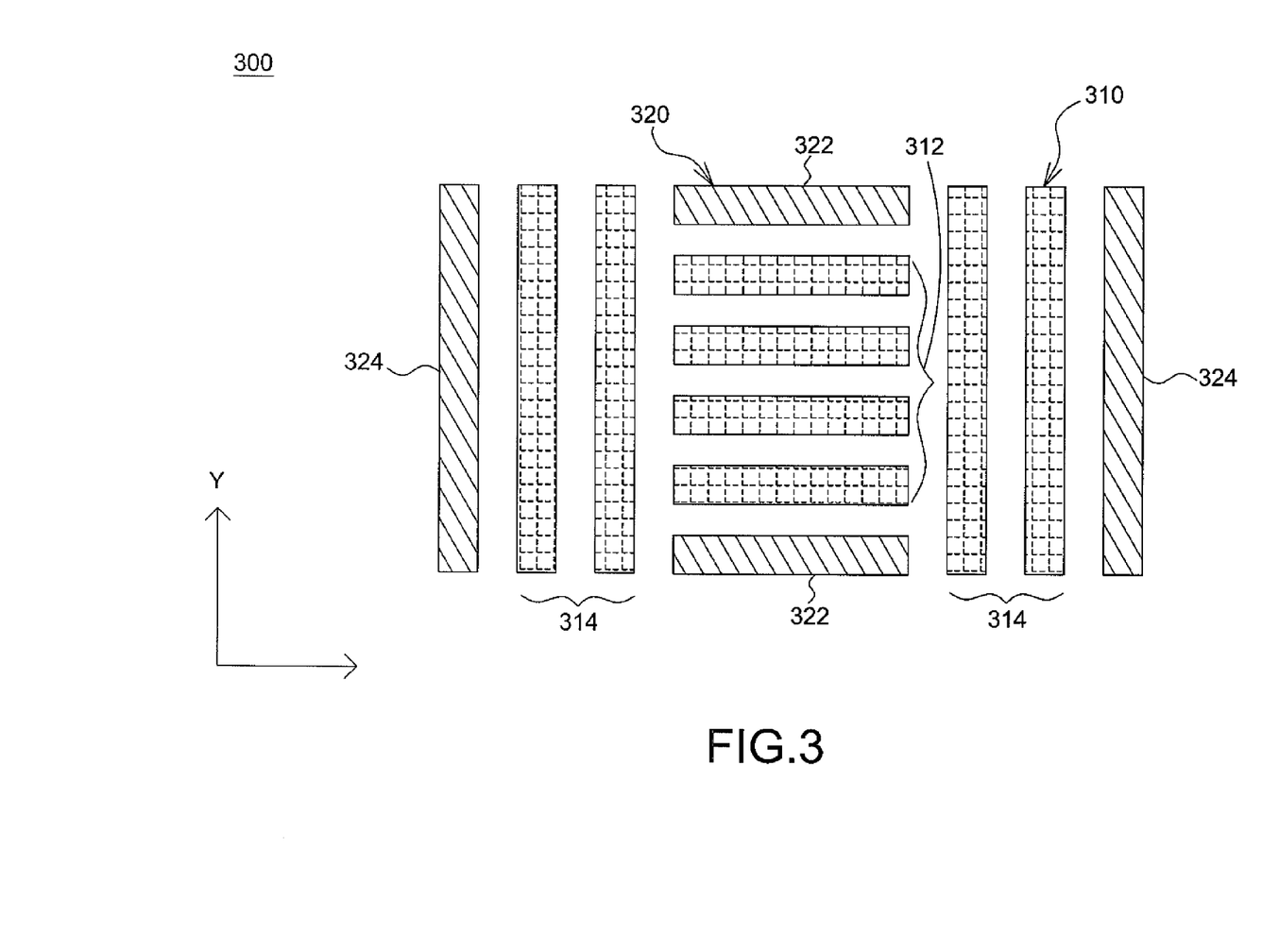
FIG. 3 illustrates a top plan view of a mark in accordance with one embodiment of the present invention.

FIG. 3 illustrates a mark 300 in accordance with one embodiment of the present invention, which includes a first mark pattern 310 (the mesh portion) and a second mark pattern 320 (the oblique-line portion). The first mark pattern 310 includes a first pattern 312 and a second pattern 314, and the first pattern 312 includes a plurality of rectangular regions arranged in Y direction and the second pattern 314 includes a plurality of rectangular regions disposed on two opposite sides of the first pattern 312 in X direction. For each rectangular region of the first pattern 312, a sideline in X direction is longer than a sideline in Y direction, while for each rectangular region of the second pattern 314, a sideline in Y direction is longer than a sideline in X direction. The shape and function of the first mark pattern 310 are similar to the alignment mark 100 shown in FIG. 1, and will be described in the following description.

The second mark pattern 320 of the mark 300 includes a third pattern 322 and a fourth pattern 324, and the third pattern 322 includes two rectangular regions disposed on two opposite sides of the first pattern 312 in Y direction and the fourth pattern 324 includes two rectangular regions disposed on two opposite sides of the second pattern 314 in X direction. It should be noted that X and Y directions can be any two directions perpendicular to each other. Each rectangular region of the first mark pattern 310 and the second mark pattern 320 may respectively include multiple pattern elements, for example, the two rectangular regions of the third pattern 322 may include a plurality of strip patterns or circle patterns which are configured to form trench structures or via structures on a photoresist layer or a wafer. However, the patterns in each rectangular region may vary with respect to applications but not be limited to the embodiments disclosed. For example, each rectangular region can include two or more pattern elements for forming two or more exposed patterns on the substrate or the photoresist layer, so that if one exposed pattern is damaged for whatever reasons disallowing role of alignment, there is still another exposed pattern can be used as a backup for alignment. The second mark pattern 320 is used together with the first mark pattern 310 for determining an overlay error between two layers on the wafer, in which the first pattern 312 is used together with the third pattern 322 for determining the overlay error in Y direction, and the second pattern 314 is used together with the fourth pattern 324 for determining the overlay error in X direction.

The first mark pattern 310 is configured to form the trench, via, or other identifiable structures on a wafer for performing the alignment steps in the subsequent process. Generally, the process flow for forming the alignment mark pattern on the wafer includes, for example, coating a photoresist layer on a surface of a wafer, and then exposure and development a photoresist layer via a mask having the first mark pattern 310 for transferring the pattern of the first mark pattern 310 into the photoresist layer. Next, the wafer is etching by using the patterned photoresist layer as a mask to form a first exposed pattern (not shown) corresponding to the first mark pattern 310 on the wafer. The first exposed pattern on the wafer is used for alignment during the subsequent exposure process. For example, before the wafer is exposed via a second mask, the exposure machine can be calibrated and adjusted based on the first exposed pattern formed on the wafer. In short, the first exposed pattern (corresponding to the first mark pattern 310) formed on the wafer can be utilized for determining a relative position between the mask and the wafer during the subsequent exposure process, wherein the part of the first exposed pattern corresponding to the first pattern 312 is utilized to determine the coordinate of the relative position in Y direction, and the part of the first exposed pattern corresponding to the second pattern 314 is utilized to determine the coordinate of the relative position in X direction.

After forming the first exposed pattern on the wafer, other semiconductor process steps can be performed, such as deposition, etching, polishing, etc. Next, a photoresist layer is formed to cover the surface of the wafer, and a mask having the second mark pattern 320 is provided. Before performing the exposure process by using this mask, an alignment step is executed based on the first exposed pattern on the wafer. Next, the photoresist layer is exposed and developed to transfer the pattern of the second mark pattern 320 into the photoresist layer, so that a second exposed pattern (not shown) corresponding to the second mark pattern 320 is formed on the photoresist layer.

Next, a relative distance between the first exposed pattern and the second exposed pattern is measured to determine the magnitude of the overlay error. The part of the second exposed pattern corresponding to the third pattern 322 is used together with the part of the first exposed pattern corresponding to the first pattern 312 for determining the overlay error in X direction, and the part of the second exposed pattern corresponding to the fourth pattern 324 is used together with the part of the first exposed pattern corresponding to the second pattern 314 for determining the overlay error in Y direction. If the magnitude of the overlay error meets the predetermined criterion, the process continues. However, if criterion is not met, the photoresist layer on the wafer is removed and replaced with another new photoresist layer, and the alignment step, the exposure step, and the development step are repeated again until the criterion is met.

Figure 4:
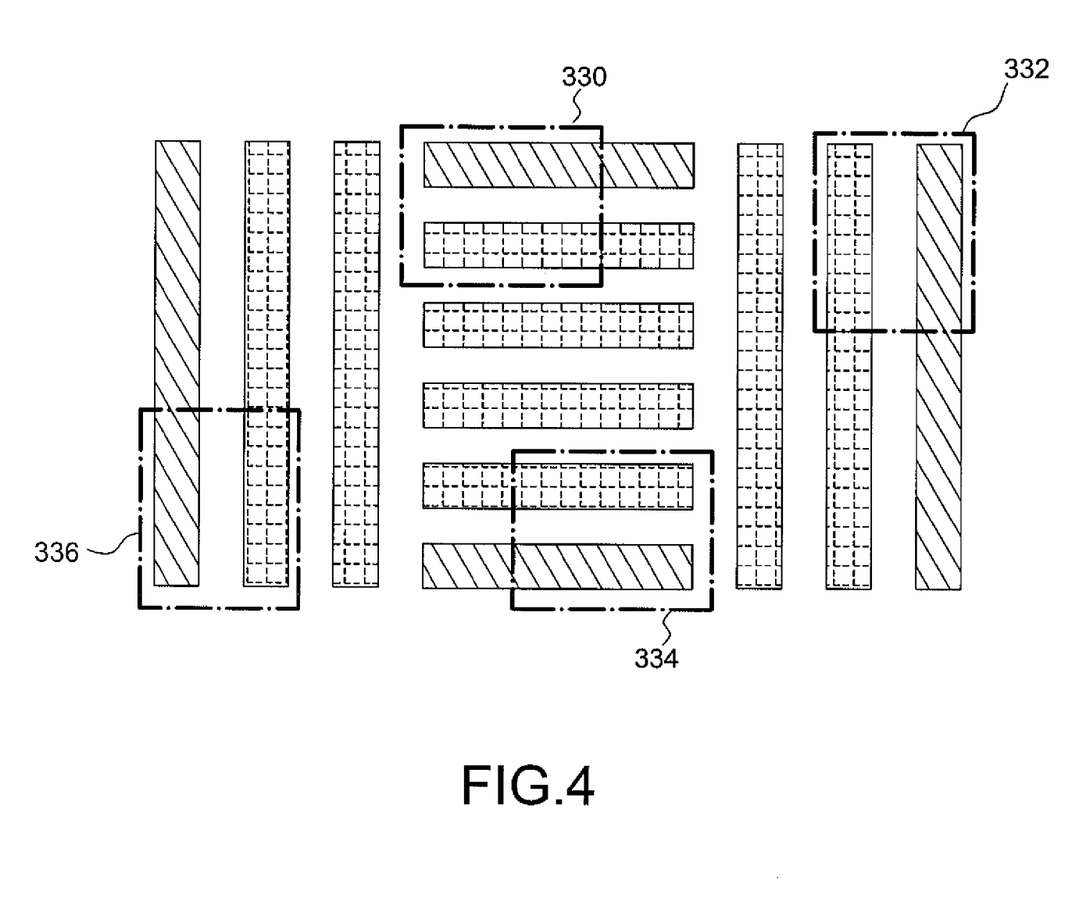
FIG. 4 illustrates a top plan view of a region selected by a measurement machine for performing an overlay error measurement in accordance with one embodiment of the present invention.

Typically, the overlay error can be measured by a measurement machine through, for example, an X-ray scanning electron microscopy(SEM), wherein the measurement machine can select a range to be measured for determining the relation among different layers. Taking the mark 300 shown in FIG. 3 as an example, FIG. 4 illustrates regions 330, 332, 334, and 336 selected by the measurement machine for performing the overlay error measurement in accordance with one embodiment of the present invention. The overlay error in X direction can be obtained by performing the measurement step in the regions 330 and 334, and the overlay error in Y direction can be obtained by performing the measurement step in the regions 332 and 336. In this embodiment, the pattern used for overlay error measurement is similar to the conventional overlay mark 200 shown in FIG. 2, in which the region 330 is similar to the regions 210a and 220a shown in FIG. 2, the region 332 is similar to the regions 210b and 220b shown in FIG. 2, the region 334 is similar to the regions 210c and 220c shown in FIG. 2, and the region 336 is similar to the regions 210d and 220d shown in FIG. 2. Therefore, the mark 300 not only has the alignment function of the alignment mark 100 shown in FIG. 1, but also has the function of overlay error measurement of the overlay mark 200 shown in FIG. 2. Because the alignment and the overlay error measurement are performed based on the same mark, the number of variables can be reduced and the measurement accuracy can be further increased.

Figure 5:
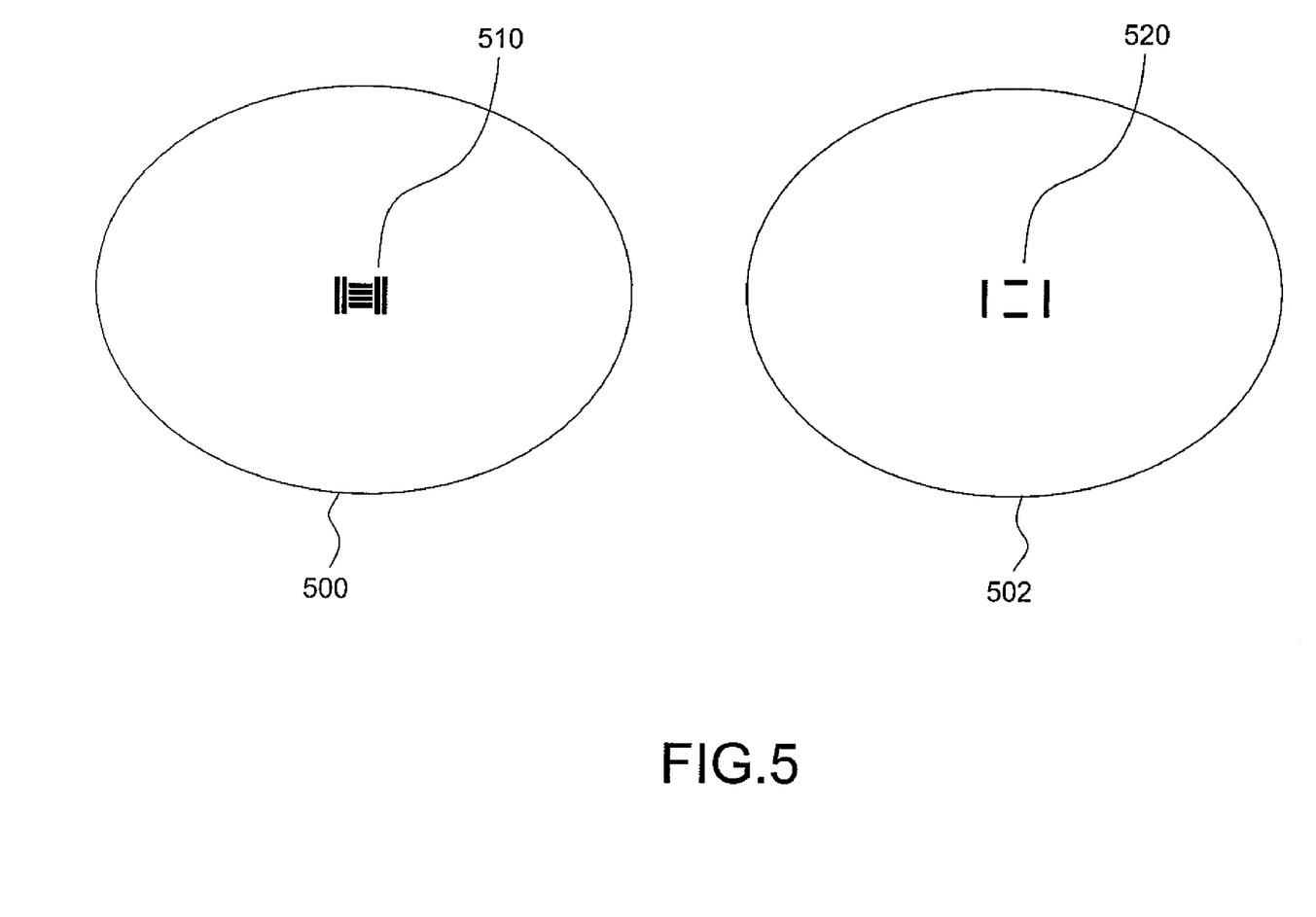
FIG. 5 is a schematic top plan view of a mask in accordance with one embodiment of the present invention.

FIG. 5 is a schematic view of a mask in accordance with one embodiment of the present invention, which includes a mask 500 for a previous layer and a mask 502 for a present layer. The mask 500 for the previous layer has a first mark pattern 510 which is the same with the first mark pattern 310 shown in FIG. 3, and the mask 502 for the present layer has a second mark pattern 520 which is the same with the second pattern 320 shown in FIG. 3. The number of the first mark pattern 510 and the second mark pattern 520 as well as their positions on the mask 500 and the mask 502 respectively are not limited in the present invention, as long as the position of the second mark pattern 520 on the mask 502 corresponds to the position of the first mark pattern 510 on the mask 500. The first mark pattern 510 on the mask 500 is configured to form a first exposed pattern on the wafer. The first exposed pattern can be used as an overlay pattern for the previous layer for measuring the overlay error of the present layer, and in addition, the mask 502 for the present layer can choose the first exposed pattern to align before performing an exposure step. After determining the relative position between the mask 502 and the wafer based on the first exposed pattern formed on the wafer, the shape of the second mark pattern 520 is transferred into a photoresist later by performing a photolithography process via the mask 502 for the present layer, which forms a second exposed pattern on the photoresist layer. Next, the relative distance between the first exposed pattern and the second exposed pattern is measured, and if the measured relative distance meets the predetermined criterion, it is indicated that the photolithography process performed on the present layer complies with the required standard and therefore the process can continue. However, when criterion is not met, the photoresist layer on the wafer is removed and then the photolithography process is repeated again until the criterion is met.

Figure 6:
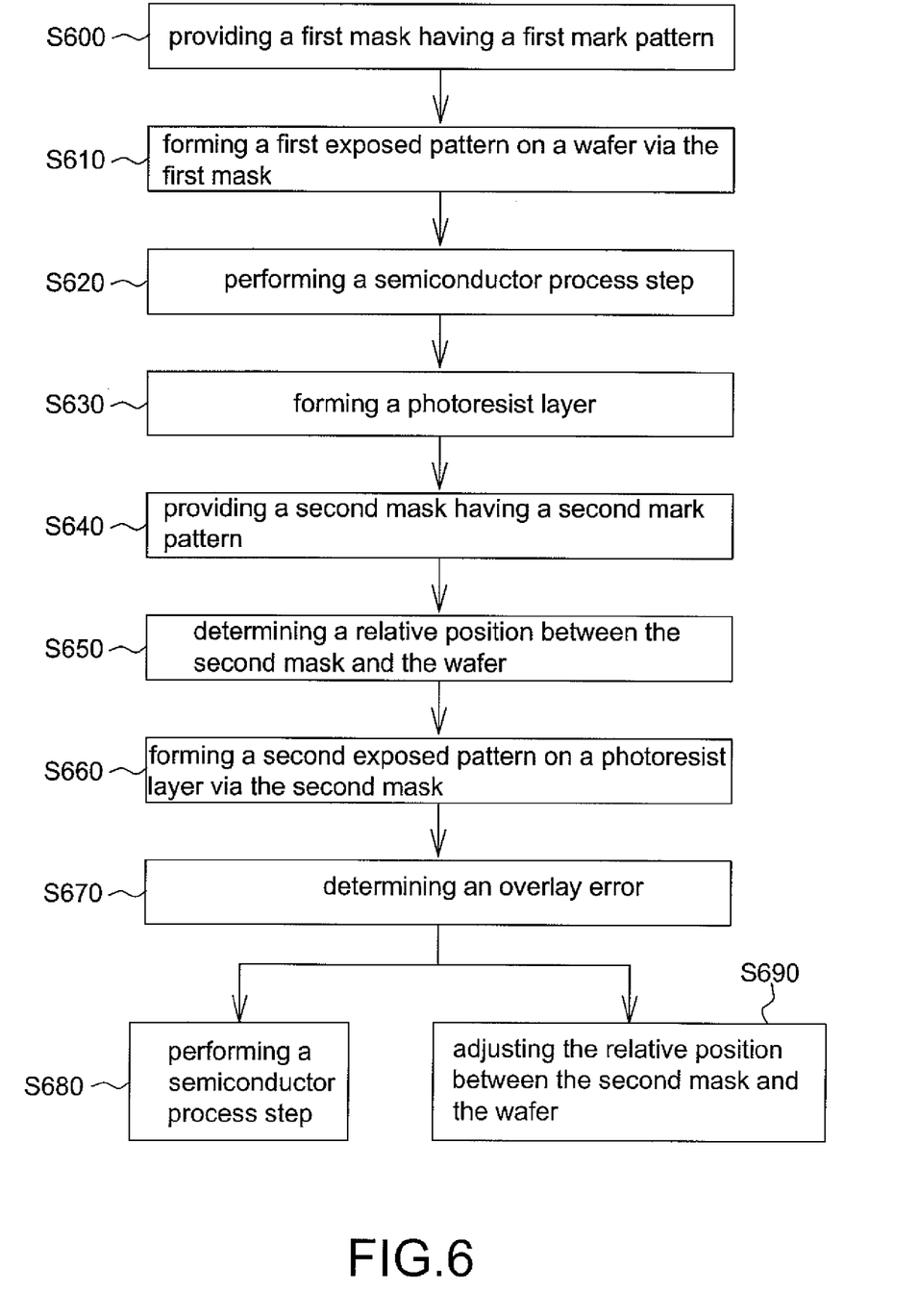
FIG. 6 is a schematic flow chart showing an exposure method in accordance with one preferred embodiment of the present invention.

FIG. 6 is a schematic flow chart showing an exposure method in accordance with one preferred embodiment of the present invention. The method employs a mask having a mark for alignment and overlay, and this mark includes a first mark pattern and a second mark pattern. The first mark pattern includes a first pattern and a second pattern, and the second mark pattern includes a third pattern and a fourth pattern. The first pattern includes a plurality of rectangular regions arranged in a first direction, and for each rectangular region, a sideline in a second direction is longer than a sideline in the first direction, wherein the first direction is perpendicular to the second direction. The second pattern is disposed on both sides of the first pattern in the second direction and includes a plurality of rectangular regions arranged in the second direction, and for each rectangular region, the sideline in the first direction is longer than a sideline in the second direction. The third pattern includes two rectangular regions disposed on both sides of the first pattern in the first direction. The fourth pattern includes two rectangular regions disposed on both sides of the second pattern in the second direction First, in the step S600, a first mask having a first mark pattern is provided. Next, in step S610, an exposure and development process is performed via the first mask to form a first exposed pattern corresponding to the first mark pattern on a wafer. The step for forming the first exposed pattern may include, for example, forming a photoresist layer on the wafer; performing a photolithography process via the first mask to pattern the photoresist layer; and etching the wafer by using the patterned photoresist layer as a mask to form the first exposed pattern on the wafer. Next, in the step S620, the pattern photoresist layer is removed, and then the subsequent steps, such as deposition, etching, polishing, etc., may be performed according to applications requirements.

Next, in the step S630, a photoresist layer is formed on the wafer. In the step S640, a second mask having a second mark pattern is provided. In the step S650, a position of the second mask relative to the wafer is determined based on the first exposed pattern formed in step S610, wherein the coordinate of the position in the first direction is determined based on a part of the first exposed pattern corresponding to the first pattern; and the coordinate of the position in the second direction is determined based on a part of the first exposed pattern corresponding to the second pattern. In the step S660, a photolithography process is performed via the second mask, and a second exposed pattern corresponding to the second mark pattern is formed on the photoresist layer formed in step S630. Next, in step S670, a relative position between the first exposed pattern and the second exposed pattern is measured to determine an overlay error. If the magnitude of the overlay error meets the predetermined criterion, the procedure proceeds to step S680 to continue the subsequent process steps. If the magnitude of the overlay error measured in step S670 is not met the predetermined criterion, the procedure proceeds to step S690. In step S690, the photoresist layer formed in step S630 is removed, and the position of the second mask relative to the wafer is adjusted based on the overlay error determined in step S670. Next, a photoresist layer is formed on the wafer, and the procedure returns to step S660 to repeat the photolithography process until the criterion is met.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

What is claimed is:

1. An exposure method, comprising the steps of:
   providing a first mask having a first mark pattern, the first mark pattern comprising a first pattern and a second pattern, the first pattern comprising a plurality of rectangular regions arranged in a first direction, a sideline in a second direction being longer than a sideline in the first direction for each rectangular region of the first pattern, the first direction being perpendicular to the second direction, the second pattern being disposed on both sides of the first pattern in the second direction and comprising a plurality of rectangular regions arranged in the second direction, and a sideline in the first direction is longer than a sideline in the second direction for each rectangular region of the second pattern; and
   forming a first exposed pattern corresponding to the first mark pattern on a wafer via the first mask, and performing a semiconductor process;
   forming a photoresist layer on the wafer;
   providing a second mask having a second mark pattern, the second mark pattern comprising a third pattern and a fourth pattern, the third pattern comprising two rectangular regions disposed on locations corresponding to both sides of the first pattern in the first direction, and the fourth pattern comprising two rectangular regions disposed on locations corresponding to both sides of the second pattern in the second direction;
   determining a position of the second mask relative to the wafer based on the first exposed pattern;
   forming a second exposed pattern corresponding to the second mark pattern on the photoresist layer via the second mask; and
   measuring a relative distance between the first exposed pattern and the second exposed pattern for determining an overlay error,
   wherein the part of the second exposed pattern corresponding to the third pattern is used together with the part of the first exposed pattern corresponding to the first pattern for determining the overlay error in the first direction, and the part of the second exposed pattern corresponding to the fourth pattern is used together with the part of the first exposed pattern corresponding to the second pattern for determining the overlay error in the second direction.

2. The exposure method according to claim 1, wherein the second mark pattern is used together with the first mark pattern for determining an overlay error between two layers on a wafer, in which the first pattern is used together with the third pattern for determining the overlay error in the second direction, and the second pattern is used together with the fourth pattern for determining the overlay error in the first direction.

3. The exposure method according to claim 1, wherein the step of determining the position of the second mask relative to the wafer further comprises the following steps:
   determining a coordinate of the position in the first direction based on a part of the first exposed pattern corresponding to the first pattern; and
   determining a coordinate of the position in the second direction based on a part of the first exposed pattern corresponding to the second pattern.

4. The exposure method according to claim 3, wherein the step of forming the first exposed pattern further comprises the following steps:
   forming a first photoresist layer on the wafer;
   performing a photolithography process via the first mask to pattern the first photoresist layer; and
   etching the wafer by using the patterned first photoresist layer as a mask to form the first exposed pattern.

5. The exposure method according to claim 4, further comprising:
   adjusting a position of the second mask relative to the wafer based on the overlay error.

* * * * *